United States Patent
Taki et al.

(10) Patent No.: US 7,012,779 B2
(45) Date of Patent: Mar. 14, 2006

(54) RECORDING AND REPRODUCING DEVICE

(75) Inventors: Yoshitsugu Taki, Kanagawa (JP); Masahide Sumimoto, Chiba (JP)

(73) Assignee: Sony Corporation, (JP)

(*) Notice: Subject to any disclaimer, the term of this patent is extended or adjusted under 35 U.S.C. 154(b) by 65 days.

(21) Appl. No.: 10/467,318

(22) PCT Filed: Dec. 10, 2002

(86) PCT No.: PCT/JP02/12936

§ 371 (c)(1), (2), (4) Date: Jan. 15, 2004

(87) PCT Pub. No.: WO03/054871

PCT Pub. Date: Jul. 3, 2003

(65) Prior Publication Data

US 2004/0114271 A1    Jun. 17, 2004

(30) Foreign Application Priority Data

Dec. 11, 2001    (JP) .............................. 2001-402647

(51) Int. Cl.
*G11B 5/584*    (2006.01)

(52) U.S. Cl. .................................................. 360/77.12
(58) Field of Classification Search ................. 360/92, 360/134, 85, 96.5, 69, 77.12
See application file for complete search history.

(56) References Cited

U.S. PATENT DOCUMENTS

| 4,775,904 A | * | 10/1988 | Kimura et al. ................. 360/85 |
| 5,754,362 A | * | 5/1998 | Konta et al. ................ 360/96.5 |
| 2002/0101685 A1 | * | 8/2002 | Taki et al. ................... 360/134 |

FOREIGN PATENT DOCUMENTS

| JP | 56-145265 A1 | 11/1981 |
| JP | 5-342728 A1 | 12/1993 |
| JP | 2002-150643 A1 | 5/2002 |

OTHER PUBLICATIONS

International Search Report.

* cited by examiner

*Primary Examiner*—David Hudspeth
*Assistant Examiner*—Mitchell Slavitt
(74) *Attorney, Agent, or Firm*—Rader, Fishman & Grauer, PLLC; Ronald P. Kananen

(57) ABSTRACT

The present invention is relative to a recording and/or reproducing apparatus having a cassette tape exchanging function of selectively taking out a cassette tape (1) accommodated in a cassette holder (130) for recording or reproducing information signals. A cassette tape driving device (150) is arranged in an inner area of a toroidally-shaped rotational plate (121) passing through the proximity of a cassette insertion/ejection opening (112) formed in a front panel (111) of a cabinet (110). The cassette tape accommodated in the cassette holder is pushed towards the cassette tape driving device by grip arms (162A), (162B) of a cassette holding mechanism (160) mounted on the opposite side of the cassette insertion/ejection opening (112) or is pulled out so as to be accommodated in the cassette tape holder.

7 Claims, 10 Drawing Sheets

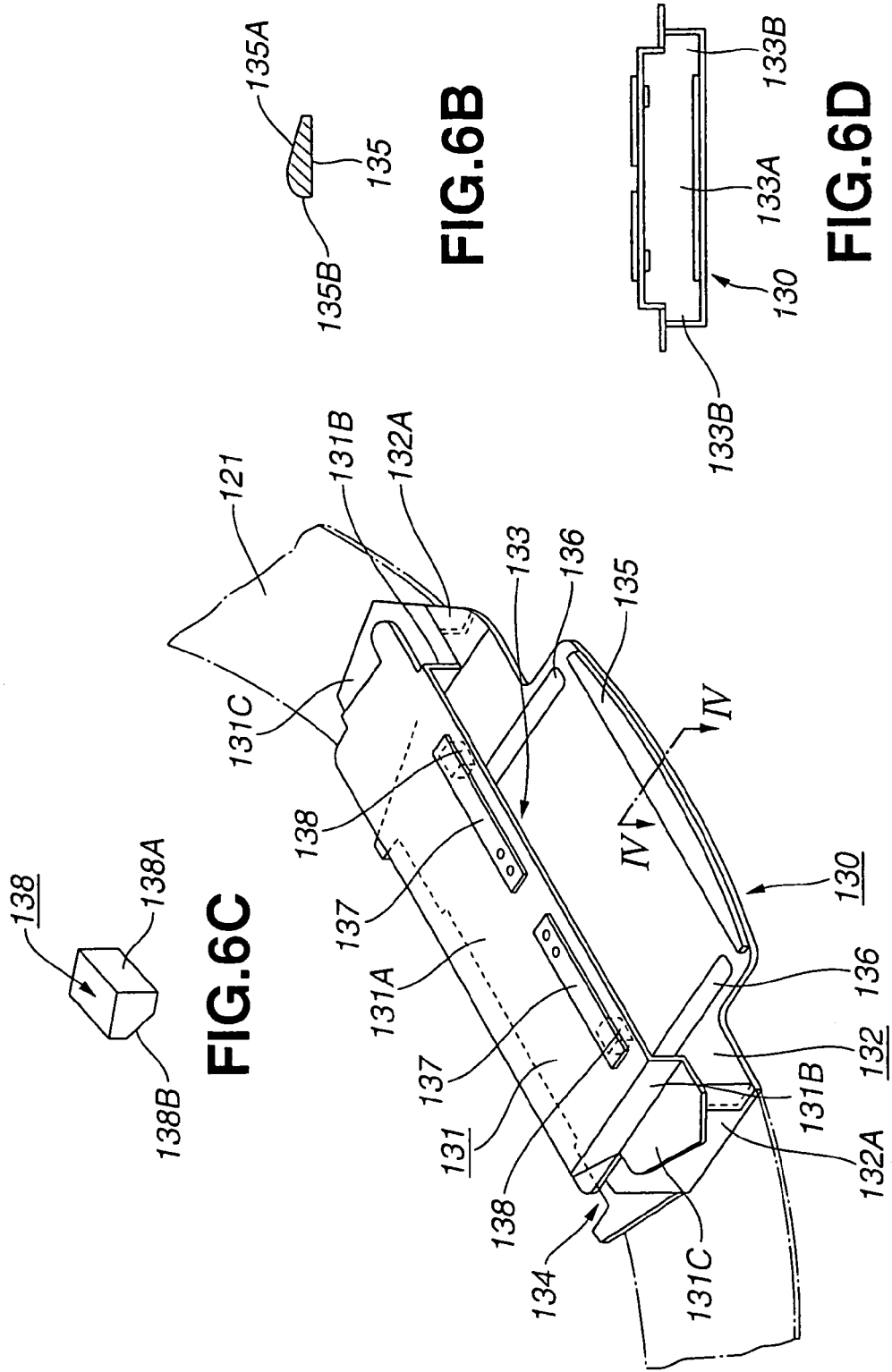

RECORDING AND REPRODUCING DEVICE

TECHNICAL FIELD

This invention relates to a recording and/or reproducing apparatus in which a plurality of cassette tapes are accommodated, a desired one of them is removed as necessary, and information signals are recorded on the removed cassette tape, or in which information signals recorded on the removed cassette tape are reproduced. This application claims priority of Japanese Patent Application No. 2001-402647, filed on Dec. 11, 2001, the entirety of which is incorporated by reference herein.

BACKGROUND ART

Up to now, a rack mount device, adapted for accommodating a plural number of a variety of electronic equipment, such as a recording and/or reproducing apparatus employing a cassette tape as a recording medium or a control device for controlling the recording and/or reproducing apparatus, is used by broadcasting stations. In this rack mount device, the plural electronic equipment, such as recording and/or reproducing apparatus, accommodated thereon are combined together to form a part of a broadcasting apparatus used in the broadcasting station. The unit of the rack mount device is an apparatus with a width of 19 inches (about 48.26 cm) and a height of 44.5 mm, such that the height of the apparatus may be changed in terms of this height of 44.5 mm as a unit, in order to accommodate a variety of the electronic equipment. That is, the rack mount device has a constant width of 19 inches and may have its height changed in terms of the unit height as a unit in keeping with the size of the electronic equipment accommodated therein.

As the recording and/or reproducing apparatus, mounted on this rack mount device, there is proposed a recording and/or reproducing apparatus, having a cassette tape exchanging function, in which a plural number of cassette tapes are accommodated in the main body unit of the apparatus and selectively taken out and loaded on the recording and/or reproducing unit for recording or reproducing information signals, such as video signals, audio signals or data signals.

As the cassette tape used in this recording and/or reproducing apparatus, a tape as shown in FIG. 1 is used. This cassette tape 1 is an 8 mm cassette tape having housed therein a magnetic tape with a tape width of 8 mm. An upper cassette half and a lower cassette half are abutted and unified together to a cassette half 2 within which a pair of tape reels are rotatably housed. The magnetic tape is placed around these tape reels and pulled outwards via a tape takeout opening formed in the front surface of the cassette half 2. The cassette half 2 is provided with a lid 3 for opening/closing the tape takeout opening. The lid 3 is rotationally-biased in the direction of closing the tape takeout opening, and when the cassette tape 1 is loaded on the recording and/or reproducing unit of the recording and/or reproducing apparatus, the lid is opened to expose the tape takeout opening to permit the magnetic tape to be drawn out from the cassette half.

On both lateral sides of the cassette half 2, there are formed engagement recesses 4, 4 engaged by, e.g., an insertion/ejection mechanism for inserting or ejecting the magnetic tape to or from the recording and/or reproducing unit.

As the aforementioned recording and/or reproducing apparatus employing the cassette tape as a recording medium and having the function of exchanging the cassette tape used, the present assignee has already proposed an apparatus configured as shown in FIGS. 2 and 3.

Meanwhile, the recording and/or reproducing apparatus having the function of exchanging the cassette tape is also termed a cassette tape library apparatus.

Referring to FIGS. 2 and 3, such recording and/or reproducing apparatus, previously proposed by the present assignee, includes a casing 12, forming the main body unit of the apparatus. Within this casing 12, there are accommodated a cassette housing mechanism 15, a cassette tape driving device 16, and a cassette insertion/ejection mechanism 17. The cassette housing mechanism 15 includes a plural number of cassette holders 14, each including multiple tiers of shelves 13 each holding the cassette tape 1. The cassette tape driving device 16, as recording and/or reproducing means, records or reproduces information signals on or from the cassette tape 1, which is housed in each cassette holder 14 and which is selectively loaded on the cassette tape driving device. The cassette insertion/ejection mechanism 17 is adapted for transferring the cassette tape 1 between the cassette housing mechanism 15 and the cassette tape driving device 16.

The cassette housing mechanism 15 includes a rotary table 20, rotationally driven by a rotational driving mechanism 19 having a driving motor 18, as shown in FIG. 3. Around the outer rim of the rotary table 20 are toroidally arranged a plural number of cassette holders 14, as shown in FIG. 2. These cassette holders 14 are arranged on the rotary table 20 so that insertion openings 14a for the cassette tapes 1 are opened outwards. The cassette housing mechanism 15 is arranged on the front side of the casing 12 so that the insertion/ejection openings 14a of the cassette holders 14 face a cassette insertion/ejection opening 30 formed in the front side of the casing 12, as shown in FIG. 2.

The cassette tape 1 is inserted into or ejected from the cassette holder 14 of the cassette housing mechanism 15 via the cassette insertion/ejection opening 14a. The cassette tape 1 is inserted into or ejected from each cassette holder 14 by actuating the rotational driving mechanism 19 for rotating the rotary table 20 for moving the cassette holder 14, into which the cassette tape 1 is inserted or from which the cassette tape 1 is ejected, to a position facing the insertion/ejection opening 30.

The cassette tape driving device 16, into which the cassette tape 1 housed in the cassette holder 14 of the cassette housing mechanism 15 is selectively loaded and which records or reproduces the information signals on or from the so loaded cassette tape 1, is arranged on the lower surface of the cassette housing mechanism 15, as shown in FIG. 3, showing a recording and/or reproducing apparatus 11, including two cassette tape driving devices 16 arranged in juxtaposition to each other.

The cassette insertion/ejection mechanism 17 is arranged towards an inner recessed portion of the casing 12, that is towards the back side of the casing opposite to the front side thereof provided with the insertion/ejection opening 30. The cassette insertion/ejection mechanism 17 includes a cassette gripping mechanism 23 and a lift mechanism 24 for moving the cassette gripping mechanism 23 between the cassette holders 14 and the cassette tape driving devices 16. The cassette gripping mechanism 23 includes a pair of grip arms 21, 22 for gripping the cassette tape 1 accommodated in one of the cassette holders 14.

The cassette insertion/ejection mechanism 17 actuates the cassette gripping mechanism 23 for intruding the paired grip arms 21, 22 into the cassette holder 14 to grip the cassette tape 1 accommodated in the cassette holder 14. The cassette insertion/ejection mechanism then actuates the paired grip arms 21, 22 in a direction away from the cassette holder 14 to pull out the cassette tape 1. The cassette insertion/ejection mechanism then actuates the lift mechanism 24 to lower the cassette gripping mechanism 23 with the cassette tape 1 gripped thereby to a lower portion of the cassette housing mechanism 15 facing one of the cassette tape driving devices 16. The cassette gripping mechanism 23 then is actuated to move the paired grip arms 21, 22 towards the cassette insertion/ejection opening of the cassette tape driving device 16 to load the cassette tape 1 on the cassette tape driving device 16. Once the cassette tape 1 is loaded on the cassette tape driving device 16, the cassette tape driving device is in a state of recording or reproducing information signals. The recording or reproducing button provided on the recording and/or reproducing apparatus 11 is then acted on to record or reproduce the information signals for the cassette tape 1.

Meanwhile, the cassette gripping mechanism 23 is controlled so as to be moved to a pre-specified one of the cassette tape driving devices 16. That is, the cassette gripping mechanism 23 is moved to a lower position facing the cassette tape driving devices 16 and subsequently moved horizontally to a position facing the specified cassette tape driving device 16.

The cassette tape 1, loaded on the cassette tape driving devices 16 and which has recorded the information signals or from which the information signals have been reproduced, is returned to the cassette holder 14 of the cassette tape housing mechanism 15 by a procedure which is the reverse of the above-described sequence of operations. That is, the cassette tape 1, loaded on the cassette tape driving device 16, is gripped by the cassette gripping mechanism 23 and pulled out from the cassette tape driving device 16. The cassette tape 1 then is moved towards the cassette holder 14 as it is gripped by the cassette gripping mechanism 23. The cassette gripping mechanism 23 then is moved towards the cassette holder 14, and the cassette tape 1 gripped by this cassette gripping mechanism 23 is housed in the original cassette holder 14 to complete the recording or reproduction of the given cassette tape 1.

It should be noted that, in the recording and/or reproducing apparatus 111 having the exchanging function for the cassette tapes 1, the cassette holders 14, each holding the cassette tape 1, are of a multi-tiered structure, and the cassette tape driving device 16 is arranged on the lower side of the cassette housing mechanism 15 provided with the cassette holders 14. Thus, it is necessary to provide a mechanism for causing movement in the horizontal direction for inserting or ejecting the cassette tape 1 into or from the cassette holder 14 of the cassette housing mechanism 15 and a mechanism for causing movement in the vertical direction across the cassette holders 14 and the cassette tape driving device 16. As a result, not only the structure of the cassette insertion/ejection mechanism 17 is complex, but also the recording and/or reproducing apparatus 1 is increased in height, thus increasing the size of the apparatus.

DISCLOSURE OF THE INVENTION

It is therefore an object of the present invention to provide a novel recording and/or reproducing apparatus whereby the aforementioned problems inherent in the recording and/or reproducing apparatus provided with the cassette tape exchanging function may be overcome.

It is another object of the present invention to provide a recording and/or reproducing apparatus whereby the apparatus may be further reduced in size and the mechanism for feeding the cassette tape from the cassette holder to the recording and/or reproducing unit for the cassette tape may be simplified.

It is yet another object of the present invention to provide a recording and/or reproducing apparatus whereby the cassette tape may be reliably inserted from the cassette holder into the recording and/or reproducing unit or ejected from the recording and/or reproducing unit into the cassette holder.

The recording and/or reproducing apparatus according to the present invention includes cassette housing means comprised of a plurality of cassette holders arranged in an annular array on the same horizontal plane in a preset distance from one another, a recording and/or reproducing unit arranged within an area defined by the cassette holders for recording signals on a cassette tape or reproducing signals from a cassette tape, and cassette tape inserting/ejecting means for loading the cassette tape on the recording and/or reproducing unit and ejecting the cassette tape therefrom.

The recording and/or reproducing apparatus according to the present invention further comprises a cabinet having a cassette tape insertion/ejection opening on a front side thereof, rotational driving means for rotationally driving the cassette housing means, and movement means for moving the cassette tape inserting/ejecting means between a position proximate to the cassette holder and a position spaced apart from the cassette holder.

In this recording and/or reproducing apparatus, the recording and/or reproducing unit is provided in an inner area surrounded by the toroidally-arranged cassette holders, and the cassette tape is moved between the cassette holder and the recording and/or reproducing unit so as to be inserted into or ejected from the recording and/or reproducing unit, so that the apparatus is reduced in thickness and, moreover, the range of movement of the cassette tape is diminished.

In the recording and/or reproducing apparatus according to the present invention, the centers of the insertion/ejection opening, provided in the cabinet, cassette housing means, recording and/or reproducing unit and the cassette tape transport means are arrayed substantially in alignment with one another. By this structure, the cassette tape may be moved along a substantially straight path.

Moreover, the movement of the cassette tape relative to the cassette holder and relative to the recording and/or reproducing unit occurs substantially in the same horizontal plane.

Preferably, a space which permits passage of the cassette tape inserting/ejecting means therethrough is provided in the cassette holder.

The recording and/or reproducing apparatus according to the present invention is provided with an annular stationary subsequently upstanding cassette stopper plate for facing inner openings of the plural toroidally-arrayed cassette holders. The cassette stopper plate includes an opening or cut-out to permit passage of a cassette tape when the cassette tape is extruded from the cassette holder into the recording and/or reproducing unit.

Preferably, there is provided an extrication-proofing or extrication-prohibiting stopper for prohibiting outward extrication of a cassette tape accommodated in the cassette holder in an outer opening of the cassette holder.

Preferably, mistaken cassette tape insertion preventative means is provided in a mid-portion of an upper plate of the cassette holder for a cassette tape extruded from outside towards inside of the cassette holder and supported by a spring plate.

Other objects, features and advantages of the present invention will become more apparent from reading the embodiments of the present invention as shown in the drawings.

BRIEF DESCRIPTION OF THE DRAWINGS

FIGS. 6A to 6D show the cassette holder provided to the recording and/or reproducing apparatus according to the present invention, where FIG. 6A is a perspective view thereof, FIG. 6B is a cross-sectional view taken along line IV—IV of FIG. 6A, FIG. 6C is a perspective view showing a block for preventing mistaken insertion of the cassette holder and FIG. 6D is a schematic front view of the cassette holder shown in FIG. 6A.

FIG. 7A is a cross-sectional view taken along line IIV—IIV of FIG. 5 showing the cassette tape being accommodated and FIG. 7B is a cross-sectional view taken along line IIV—IIV of FIG. 5 showing the cassette tape completely accommodated within the cassette holder, beginning from the state shown in FIG. 7A.

BEST MODE FOR CARRYING OUT THE INVENTION

Figure 1:
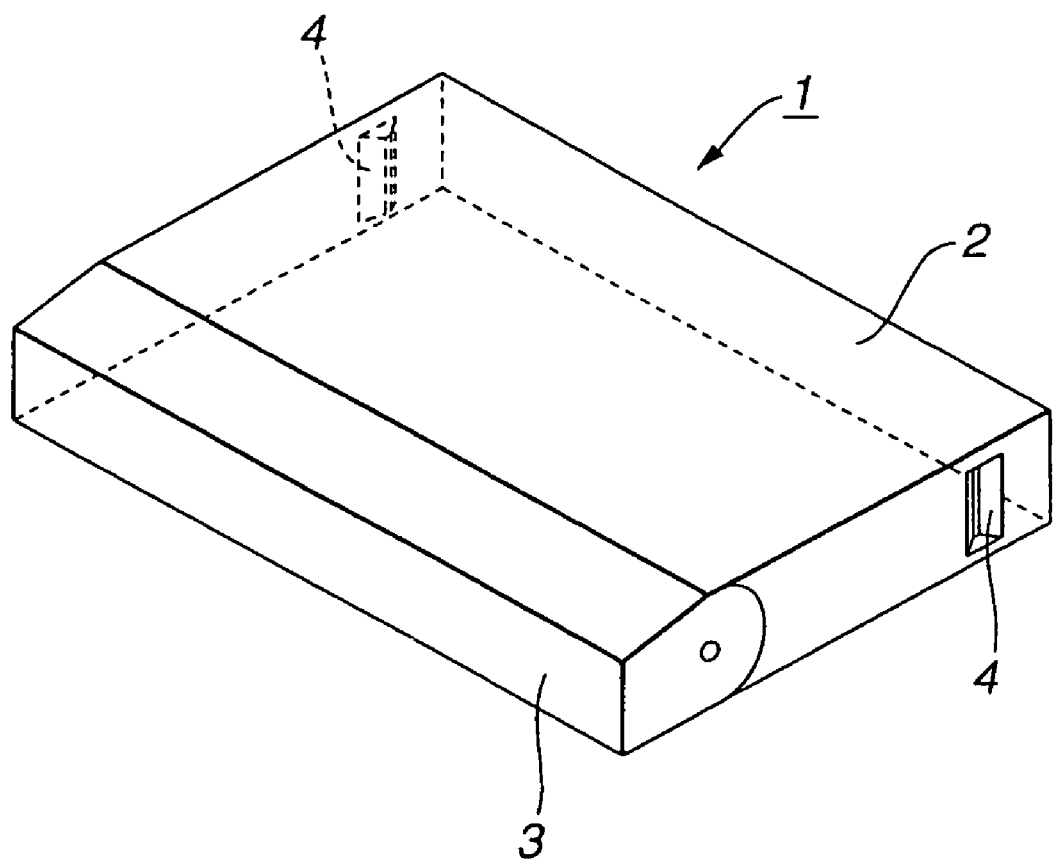
FIG. 1 is a perspective view showing a cassette tape used in a recording and/or reproducing apparatus according to the present invention.
Figure 2:
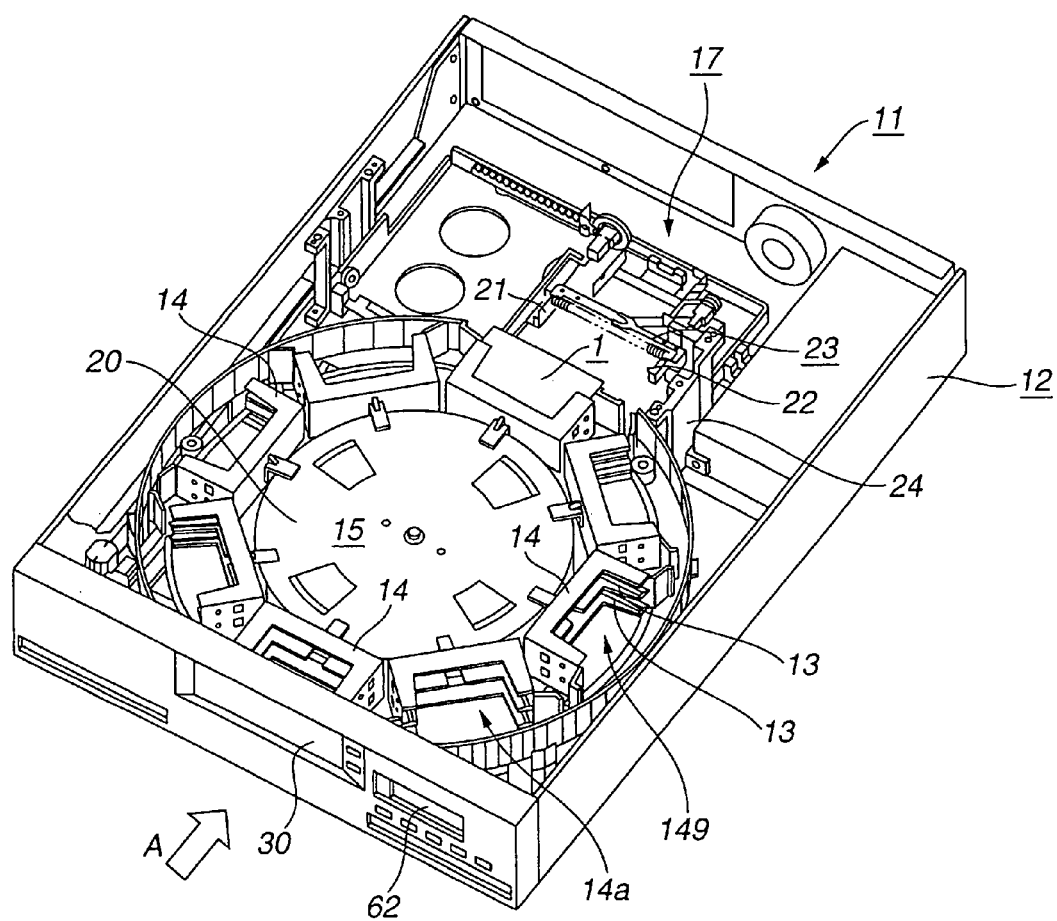
FIG. 2 is a perspective view showing a recording and/or reproducing apparatus having a cassette tape exchanging function which represents the related art of the present invention.
Figure 3:
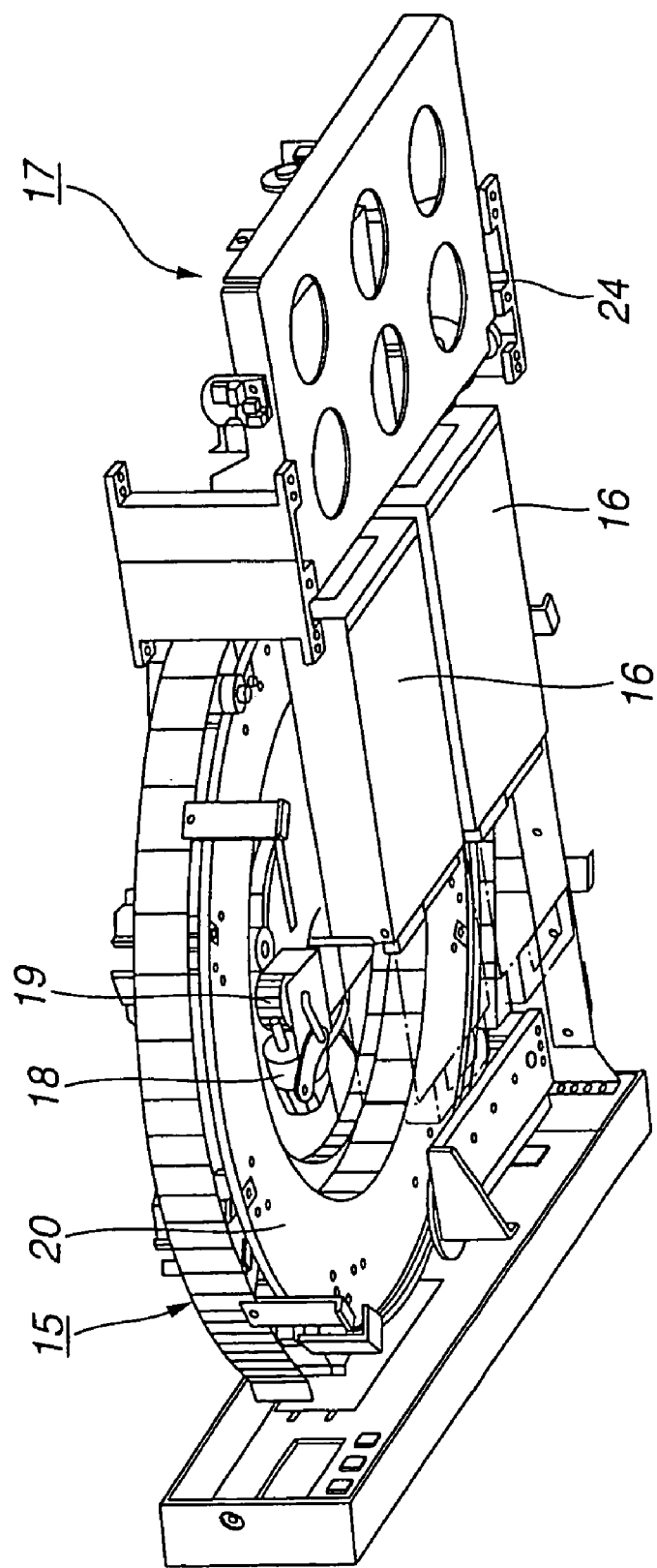
FIG. 3 is a perspective view of a recording and/or reproducing apparatus showing the bottom side where a cassette tape driving device is mounted.

Referring to the drawings, a recording and/or reproducing apparatus according to the present invention is now explained in detail.

Figure 4:
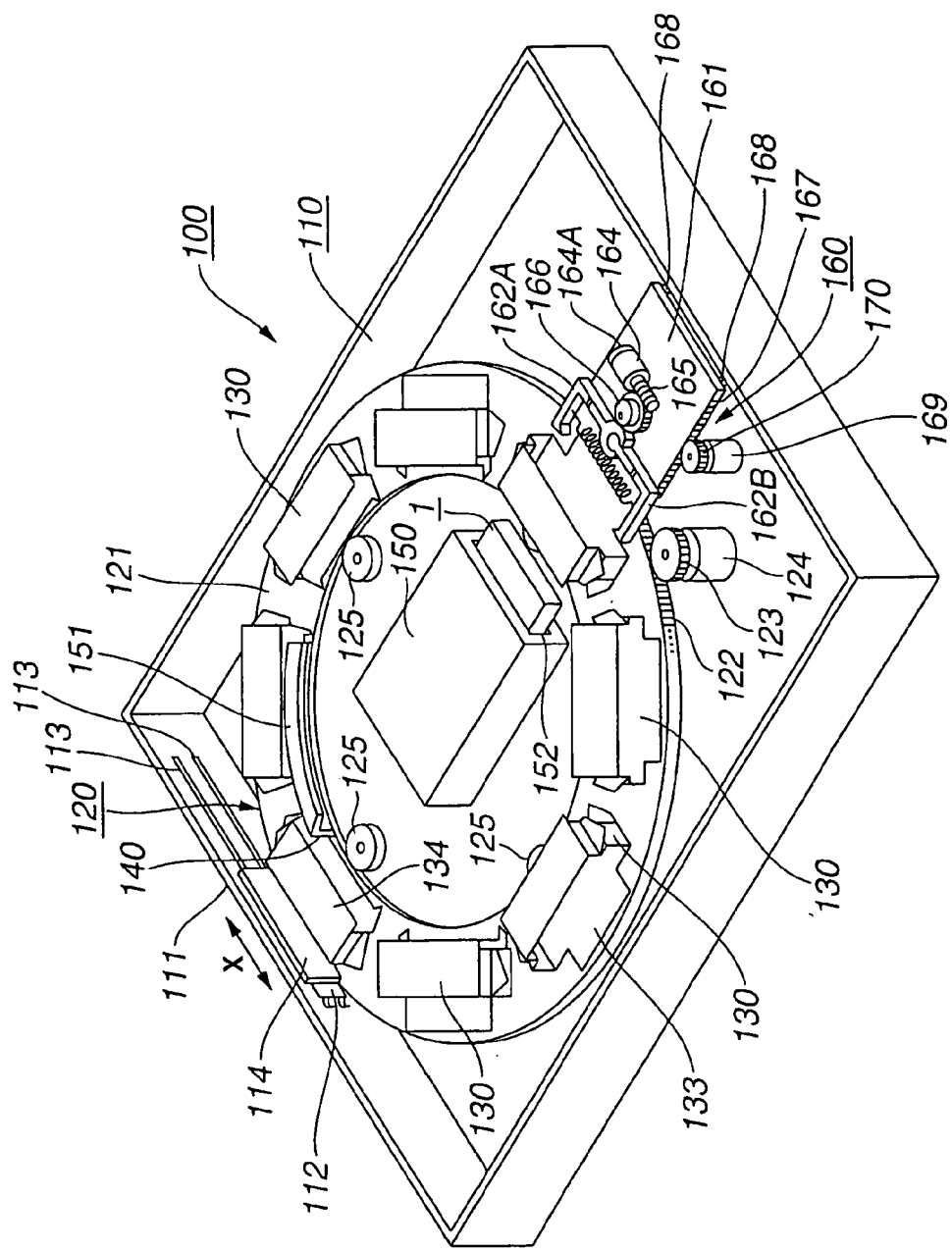
FIG. 4 is a perspective view of the recording and/or reproducing apparatus according to the present invention, with an upper lid thereof removed.
Figure 5:
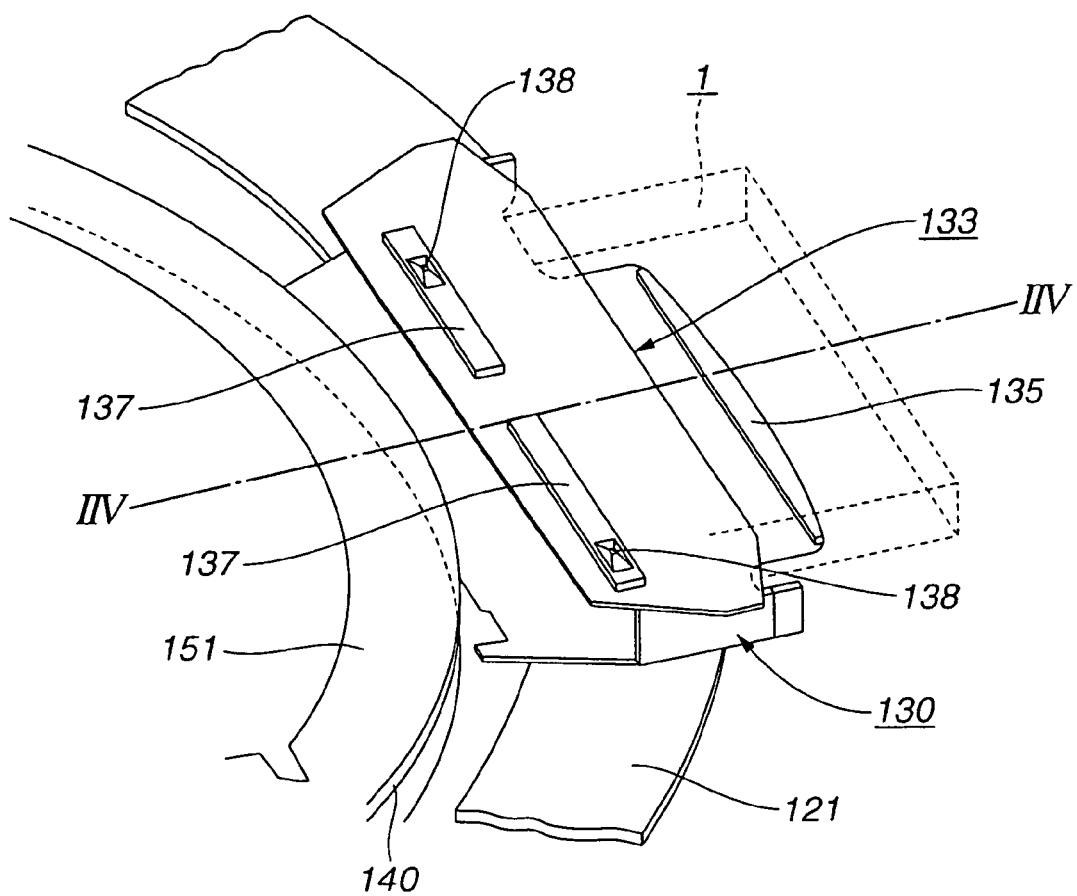
FIG. 5 is an enlarged schematic perspective view showing the vicinity of a cassette holder provided to the recording and/or reproducing apparatus.

Referring first to FIG. 4, the structure of the recording and/or reproducing apparatus embodying the present invention is explained.

The recording and/or reproducing apparatus according to the present invention uses a cassette tape 1, shown in FIG. 1, as a recording medium. The recording and/or reproducing apparatus 100 includes a cabinet 110, forming a main body unit of the apparatus. Within this cabinet 110, there are arranged a cassette housing mechanism 120, an annular fence 140, playing the role of a cassette stopper (see FIGS. 7 to 9), a cassette tape driving device 150, forming a recording and/or reproducing unit, and a cassette holding mechanism 160.

The cassette housing mechanism 120 includes a plural number of cassette holders 130 arranged toroidally around the outer rim of a toroidally-shaped rotational plate 121 at a preset distance from one another. The cassette holders 130 are arranged on the rotational plate 121 so that, when the rotational plate 121 is rotated and moved to the front side of the cabinet 110, the cassette holders 130 face an insertion/ejection opening 112 formed in a front panel 111 mounted to the front side of the cabinet 110. In an inner region surrounded by the cassette holders 130, arranged toroidally on the rotational plate 121, there is arranged the cassette tape driving device 150 forming the recording and/or reproducing unit. The cassette tape driving device 150 is mounted with a cassette insertion/ejection opening 152 towards the back side of the cabinet 110, opposite to the front side thereof provided with the cassette insertion/ejection opening 112. Facing a cassette inserting/ejecting opening 152 of the cassette tape driving device 150 on both sides of the cassette holders 130 is mounted the cassette gripping mechanism 160 forming a cassette inserting/ejecting mechanism for taking out the cassette tape 1 housed within the cassette holders 130 for loading the cassette tape 1 in the cassette tape driving device 150. The cassette holding mechanism 160 includes a pair of holding arms 162A, 162B engaging in engagement recesses 4, 4 provided in both lateral sides of the cassette tape 1 for holding the cassette tape 1.

With the recording and/or reproducing apparatus 100 of the present invention, the cassette insertion/ejection opening 112 provided in the cabinet 110, the cassette tape driving device 150 and the paired holding arms 162A, 162B of the cassette gripping mechanism 160 are arrayed substantially in alignment with one another, on a common centerline, and are arranged on the same height level. That is, the insertion/ejection opening 112, the cassette tape driving device 150 and the cassette holding mechanism 160 are arranged on the same plane for causing movement of the cassette tape 1 on the same plane.

The cabinet 110, forming the recording and/or reproducing apparatus 100 of the present invention, is formed to a width of 19 inches, so as to be housed and arranged in a standard rack mount device used in a broadcasting station. The cabinet 110 has its height set to conform to the unit of the electronic equipment housed and arranged in the standard rack mount device. That is, the electronic equipment, housed and arranged in the standard rack mount device, has its height changed in terms of a height of one height step of 44.5 mm as a unit. The recording and/or reproducing apparatus 100 according to the present invention is formed as a flat parallelepiped device having a height of 44.5 mm or less, so that the apparatus may be housed and arranged within the standard rack mount device compatibly with other electronic equipment.

The cassette insertion/ejection opening 112, provided in the front panel 111 mounted on the front side of the cabinet 110 to permit insertion or ejection of the cassette tape 1, is usually closed by a shutter 114, except when the cassette tape 1 is inserted or ejected. The shutter 114 is moved in the direction indicated by an arrow X in FIG. 4 as it is guided by a pair of guide rails 113, 113 provided on the inner surface of the front panel 111.

The cassette housing mechanism 120, within which is accommodated the cassette tape 1 inserted into the cabinet 110 through the cassette insertion/ejection opening 112, is positioned on the front side of the cabinet 110, as shown in FIG. 4, for taking up the major portion of the spacing within the cabinet 110.

The cassette housing mechanism 120 includes the rotational plate 121, a driving motor 124 for rotationally driving the rotational plate 121 and a plural number of the cassette holders 130. There are provided eight cassette holders 130.

The rotational plate 121 is a toroidally-shaped plate on the outer rim of which is formed a rack 122. This rack 122 meshes with a gear 123, which is mounted on the rotational shaft of the driving motor 124, so that by actuating the driving motor 124, the rotational plate 121 is run in rotation. The rotational plate 121 is rotationally supported by having its inner periphery engaged by plural rollers 125. On the upper surface of the rotational plate 121 are arranged the plural number of cassette holders 130 at a preset separation from one another.

The cassette holders 130, forming the cassette housing mechanism 120, is made up by an upper plate 131 and a lower plate 132, as shown in FIG. 6A. The upper plate 131 and the lower plate 132 are unified together by, e.g., a screw and include an outer opening 133, via which the cassette tape 1 is inserted into the cassette holders 130 from the cassette insertion/ejection opening 112 of the front panel 111, and an inner opening 134, via which the cassette tape 1 accommodated in the cassette holders 130 is inserted into and ejected from the cassette tape driving device 150.

On both extreme ends of the lower plate 132 are formed side plates 132A bent upwards and erected upright, as shown in FIG. 6A. The upper plate 131 can be secured in position by these side plates 132A. These side plates 132A are formed to a height lower than the thickness of the cassette tape 1.

To the foremost part of the lower plate 132 is secured an extrication-proofing or extrication-prohibitng stopper 135 swollen out upwards for inhibiting extrication of the cassette tape 1. This extrication-proofing stopper 135 has its outer side formed as an inclined surface 135A, while having its inner side formed as a vertically-extending surface 135B, as shown in the cross-sectional view of FIG. 6B. On the left and right lateral sides of the lower plate 132, are laid a pair of sliders 136 adapted for supporting the bottom surface of the cassette tape 1 in a floated position from the plate surface of the lower plate 132 for reducing the frictional resistance for facilitating the sliding.

The upper plate 131 is bent to a shallow chevron shape and provided with a horizontal plate section 131A of a broad width and vertical sections of shorter lengths on both sides of the horizontal plate section. The lower ends of the vertical sections are bent outwards at right angles to the vertical sections to form L-shaped side plate sections 131B. The horizontal sections of the L-shaped side plate sections 131B are horizontal plate sections 131C.

The spacing between the horizontal plate section 131A and the sliders 136 of the lower plate 132 is set so as to be slightly wider than the thickness of the cassette tape 1 so as to permit insertion and ejection of the cassette tape 1 without interference. The spacing between the horizontal plate sections 131C of the side plate sections 131B of the upper plate 131 and the lower plate 132A is sufficiently smaller than the thickness of the cassette tape 1 to inhibit intrusion of the cassette tape 1 therein.

Thus, as shown in the schematic view of FIG. 6D, showing the outer opening 133 of the cassette holders 130, when the upper plate 131 and the lower plate 132 are connected to each other to form the cassette holder 130, the center portion of the outer opening 133 becomes a cassette insertion/ejection opening 133A, via which the cassette tape 1 is inserted or ejected, while small-sized openings with a reduced height on both sides of the cassette insertion/ejection opening 133A become gripping arm insertion openings 133B via which a pair of gripping arms 162A, 162B is inserted, as explained subsequently.

Figure 7A:
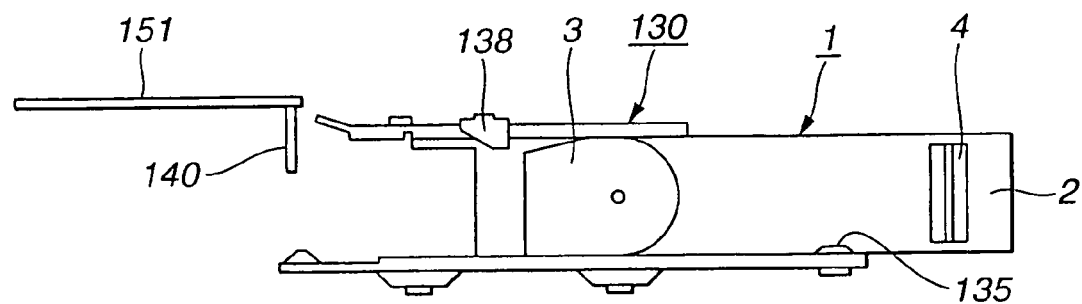
FIGS. 7A and 7B show the cassette tape shown in FIG. 1 normally accommodated in a cassette holder, where
Figure 8:
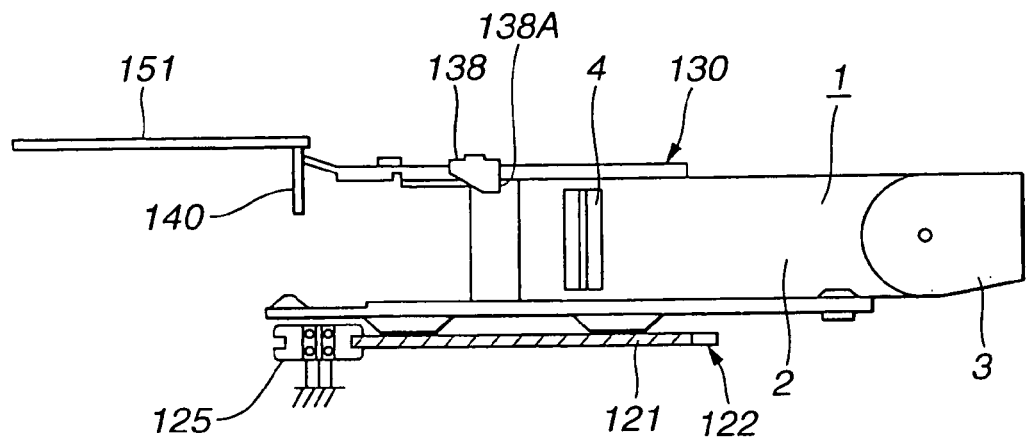
FIG. 8 is a cross-sectional view taken along line IIV—IIV of FIG. 5 showing the state in which it is attempted to insert the cassette tape into the cassette holder when the cassette tape is turned upside down and reversed in the forward-and-aft direction.
Figure 9:
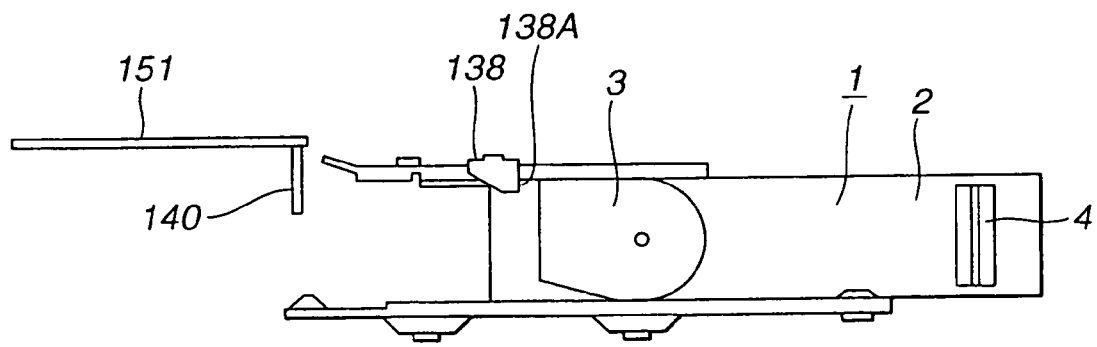
FIG. 9 is a cross-sectional view taken along line IIV—IIV of FIG. 5 showing the state in which it is attempted to insert the cassette tape into the cassette holder as the cassette tape is turned upside down.

To a mid-portion of the outer surface of the upper plate 131 towards the outer opening 133, the proximal ends of a pair of spring plates 137 are secured, while a pair of mistaken-insertion preventative blocks 138 for the cassette tape 1 are secured to the lower surface portions of the foremost part of the upper plate 131 extending to both left and right sides as free ends. The mistaken-insertion preventative blocks 138 are formed so as to be slightly protruded into the cassette holder 130 via an opening formed in the upper plate 131, as shown in FIGS. 7 to 9. The surface of the mistaken-insertion preventative block 138 facing the outer opening 133 is formed as a vertical surface 138A, while the lower surface thereof facing the inner opening 134 is formed as an inclined surface 138B, as shown in FIG. 6C.

The annular fence 140 is fixedly mounted along the inner peripheral surface of the cassette housing mechanism 120, in proximity to the inner opening 134 of the cassette holder 130, as shown in FIGS. 4 to 9. Specifically, the annular fence 140 is a strip-shaped member of a height sufficient to stop at least an upper portion of the inner opening 134 of the cassette holders 130. This annular fence 140 is vertically mounted to a toroidally-shaped plate 151, mounted to a disc-shaped cover overlying and protecting the cassette tape driving device 150, as will be explained subsequently. The annular fence 140 may be formed by vertically and downwardly warping the outer rim of the toroidally-shaped plate 151.

Although shown only in part in FIG. 4, the annular fence 140 is formed along the entire rim area. However, the annular fence 140 either is not provided or is partially removed in an area ahead of the cassette inserting/ejecting opening 152 of the cassette tape driving device 150, in order that the cassette tape 1 housed in the cassette holder 130 can be extruded towards the cassette tape driving device 150 by the cassette holding mechanism 160 forming the cassette insertion/ejection means for loading the cassette tape on the cassette tape driving device 150.

Figure 7B:
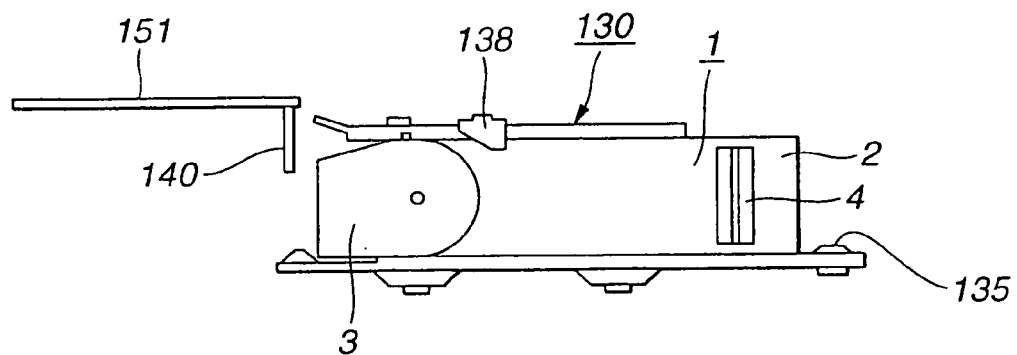

Referring to FIG. 7B, if, when the user manually thrusts the cassette tape 1 into the cassette holders 130, the user has excessively thrust the cassette tape 1, and the cassette tape is intruded into the cassette tape driving device 150, in the absence of the annular fence 140, such that the cassette tape 1 cannot be retained at a preset position. In order to prevent the cassette tape 1 from becoming unable to be positioned correctly, at least the upper end of a lid 3 of the cassette tape 1 is designed to abut against the annular fence 140 to present the cassette tape 1 from being intruded further towards the inner region. Thus, the cassette tape 1 is positioned by the annular fence 140 and an extrication preventative stopper 153 provided to the outer opening 133 of the cassette holders 130. The above is the function of the annular fence 140.

The cassette tape driving device 150, forming the recording and/or reproducing unit used in the recording and/or reproducing apparatus 100 of the present invention, has enclosed therein, e.g., a rotational magnetic head device having a rotational magnetic head, a tape running device for running the magnetic tape provided in the rotational magnetic head device and a guide device for guiding the magnetic tape. The cassette tape driving device 150 is not essential to the present invention, and hence is not explained in detail. It should be noted, however, that the cassette tape driving device 150 is arranged inwardly of the toroidally-shaped rotational plate 121 of the cassette housing mechanism 120 with the cassette insertion/ejection opening 152 for the cassette tape 1 facing the back side opposite to the cassette insertion/ejection opening 112 of the front panel 111, that is, with the cassette insertion/ejection opening directly opposite to the cassette holding mechanism 160 mounted towards the back side of the cabinet 110.

Figure 10:
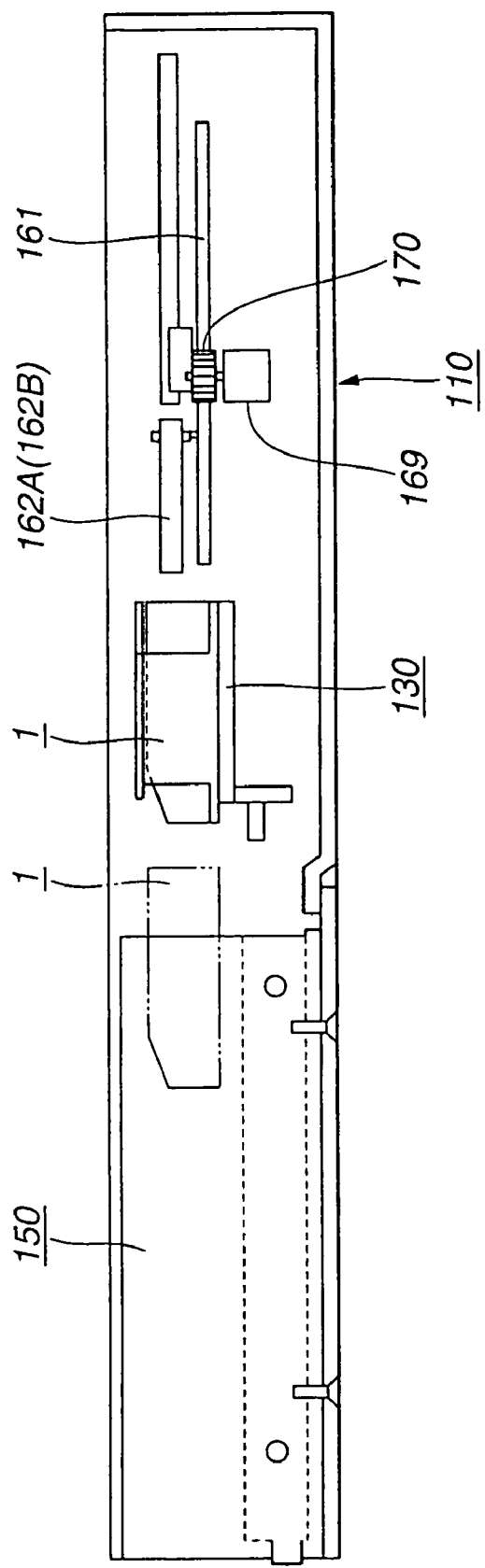
FIG. 10 is a cross-sectional side view of a recording and/or reproducing apparatus according to the present invention.
Figure 11:
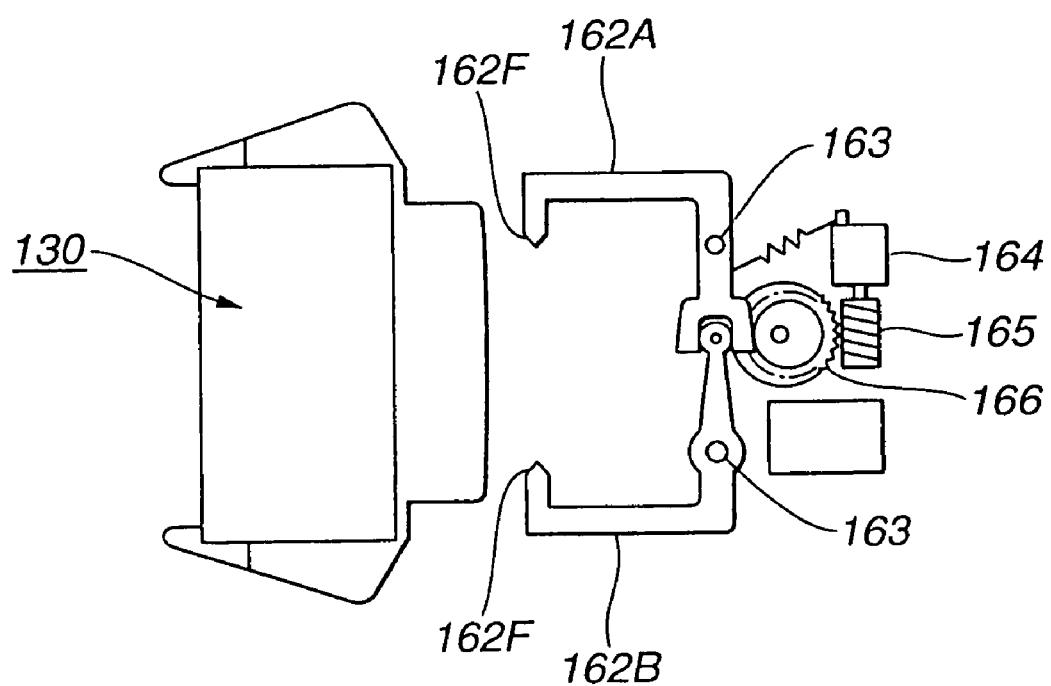
FIG. 11 is a schematic plan view showing a cassette holding mechanism.

The structure of the cassette holding mechanism 160, forming the cassette insertion/ejection mechanism, is now explained with reference to FIGS. 4, 10 and 11.

The cassette holding mechanism 160, arranged towards the back side of the cabinet 110, thrusts the cassette tape 1, housed in the cassette holders 130 of the cassette housing mechanism 120, from the inner opening 134 through the opening 152 of the cassette tape driving device 150 into its inside, by way of insertion, and also pulls out the cassette tape 1 loaded in the cassette tape driving device 150 for housing in the cassette holders 130.

The cassette holding mechanism 160 includes a substantially rectangular slide plate 161 as a base member. On the upper surface of the slide plate 161, a pair of grip arms 162A, 162B are provided facing the front side of the cassette tape driving device 150. These grip arms 162A, 162B are pivotally mounted on rotational pivots 163, 163. The foremost parts of the grip arms 162A, 162B are formed as inwardly directed hooks 162F, 162F. The one of the grip arms 162A is bifurcated, with the circular proximal end of the other grip arm 162B being fitted for rotation within the bifurcations.

In rear of these grip arms 162A, 162B, there are provided a first pulse motor 164 for driving the grip arms 162A, 162B in the opening/closing directions, a worm gear 165 formed on the output shaft of the pulse motor and a spur gear 166 meshing with the worm gear 165. This spur gear 166 meshes with another spur gear, not shown, secured below the grip arm 162B. An encoder 164A is coupled to the first pulse motor 164.

On one lateral side of the slide plate 161 is formed a rack 167 for extending substantially its entire length, as shown in FIG. 4. Although not shown, the slide plate 161 is mounted on the chassis, arranged below the slide plate 161, and a pair of linear guides 168, 168 are laid on the chassis parallel to each other and at a spacing substantially corresponding to the width of the slide plate 161 from each other (see FIG. 4). The slide plate 161 is coupled to these linear guides 168, 168 for sliding thereon. On a chassis, not shown, there is arranged a driving mechanism made up by a second pulse motor 169 and a gear 170 coupled to this rotational shaft. This gear 170 meshes with the rack 167 of the slide plate 161. The driving mechanism forms driving means for causing movement of the cassette holding mechanism 160 forming the cassette insertion/ejection means.

The operation of the above-described cassette holding mechanism 160 is now explained with reference to FIGS. 4, 6, 10 and 11.

When the recording and/or reproducing apparatus is in the halted state, the slide plate 161 is at a standby state at the most receded position. When the cassette tape 1 housed in the cassette holders 130 is loaded on the cassette tape driving device 150, the second pulse motor 169 is actuated, under control by the encoder 164A, for advancing the slide plate 161 towards the cassette tape driving device 150. Simultaneously, the first pulse motor 164 is actuated for inwardly contracting the spacing between the hooks 162F, 162F of the paired grip arms 162A, 162B. By further advancing the slide plate 161, the back surfaces of the inwardly contracted hooks 162F thrust the cassette tape 1 housed in the cassette holders 130 for loading the cassette tape 1 from the opening 152 of the cassette tape driving device 150 in position in the cassette tape driving device 150. When the cassette tape 1 is loaded on the cassette tape driving device 150, the slide plate 161 is receded and reverts to its stand-by position.

When the recording or reproduction of the of the cassette tape 1 loaded on the cassette tape driving device 150 has come to a close, the cassette tape 1 is ejected and held in the opening 152 of the cassette tape driving device 150 so as not to be detached from the opening 152.

The second pulse motor 169 is actuated, under control by the encoder 164A, for advancing the slide plate 161, at the same time as the first pulse motor 164 is actuated to open the paired grip arms 162A and 162B. The slide plate 161 is further advanced, with the paired grip arms 162A, 162B passing through a grip arm insertion opening 133B in the cassette holders 130 to fit into engagement recesses 4, 4 formed in both lateral surfaces of the cassette tape 1, which is at a standby position. The second pulse motor 169 is then rotationally driven in reverse, so that the slide plate 161 is receded, at the same time as the cassette tape 1 sandwiched between the grip arms 162A and 162B is pulled back into and housed within the inside of the cassette holders 130.

When the cassette tape 1 has reached the preset position, the second pulse motor 169 is actuated in reverse to open the hooks 162F, 162F apart, with the slide plate 161 being further receded and returned to its original standby position.

As may be seen from the foregoing description, the most significant feature of the recording and/or reproducing apparatus 100 of the present invention is that the respective centers of the cassette insertion/ejection opening 112 in the cabinet 110, cassette holders 130, cassette tape driving device 150 and the cassette holding mechanism 160 are arranged on a substantially straight line. As another significant feature of the recording and/or reproducing apparatus 100 of the present invention, the cassette insertion/ejection opening 112 in the cabinet 110 and the inlet/exit openings of the cassette holders 130 and the cassette tape driving device 150 are arranged in the same horizontal plane so that the movement of the cassette tape 1 with respect to these devices may occur within the same plane.

The operation of the recording and/or reproducing apparatus 100 of the present invention is now explained with reference to the drawings.

First, an operator inserts the cassette tape 1, about to be accommodated, via the cassette insertion/ejection opening 112 of the front panel 111 in the regular orientation shown in FIG. 7A, as shown in FIG. 4. The shutter 114, opening/closing the cassette insertion/ejection opening 112, is opened laterally by a driving mechanism, not shown, so that the cassette tape 1 is inserted into the vacant cassette holder 130, located ahead of the cassette insertion/ejection opening 112, via the outer opening 133 of the vacant cassette holder 130, as shown in FIG. 7B.

During this introducing operation, the bottom of the cassette tape 1 smoothly surmounts the inclined surface 135A of the extrication preventative stopper 153, and since the lid 3 of the cassette tape 1 is formed as an inclined surface, the cassette tape 1 is inserted into the inside of the cassette holder 130, as the lid 3 uplifts the mistaken-insertion preventative block 138.

On the other hand, if the operator has excessively inserted the cassette tape 1, the lid 3 of the cassette tape 1 abuts against the annular fence 140 to impede further forward movement of the cassette tape 1, so that the cassette tape 1 is housed in the preset position within the cassette holder 130. If once the cassette tape 1 is accommodated in position, the lower back surface of the cassette tape 1 is caught by the vertically-extending surface 135B of the extrication-proofing or extrication-prohibiting stopper 135, so that the cassette tape 1 cannot be easily extricated outwards, even on rotation of the rotational plate 121.

If the operator inadvertently has inserted the cassette tape 1 turned upside-down, and moreover inverted in the fore-and-aft direction, as shown in FIG. 8, the forward back surface of the inserted cassette tape 1 is the vertically-extending surface, and hence this surface abuts against the vertical surface 138A of the mistaken-insertion preventative block 138 to obstruct further insertion of the cassette tape 1.

If the operator inadvertently has inserted the cassette tape 1 upside-down, as shown in FIG. 9, since the forward surface of the lid 3 of the inserted cassette tape 1 is a vertically-extending surface, it compresses against the vertical surface 138A of the mistaken-insertion preventative block 138 to obstruct further insertion of the cassette tape 1. In any case, if the cassette tape 1 has not been inserted in the correct orientation, the insertion of the cassette tape 1 is inhibited to assure safe operation.

In the above-described operational principle, the cassette tape 1 about to be introduced actuates the motor 124 and the gear 123 to run the rotational plate 121 in rotation to cause the vacant cassette holder 130 to be halted ahead of the cassette insertion/ejection opening 112 so as to permit the cassette tape to be accommodated in the cassette holder.

If information signals are recorded or reproduced for the desired cassette tape 1, the motor 124 is actuated to run the rotational plate 121 to halt the cassette holder 130 holding the cassette tape 1 of interest ahead of the cassette tape driving device 150.

The second pulse motor 169 is then actuated, under control by the encoder 164A, to advance the slide plate 161 towards the cassette tape driving device 150. The first pulse motor 164 is also actuated to reduce the spacing between the hooks 162F, 162F of the grip arms 162A, 162B to extrude the cassette tape 1 so far gripped by these grip arms. The cassette tape 1 is pushed via the inner opening 134 of the cassette holder 130 into the inside of the cassette tape driving device 150, so that the cassette tape 1 is ready to be recorded or reproduced. The slide plate 161 is receded to its standby position.

When the recording or reproduction of the cassette tape 1 loaded on the cassette tape driving device 150 has come to a close, the cassette tape 1 is ejected and held in the opening 152 of the cassette tape driving device 150. The second pulse motor 169 is actuated under control by the encoder 164A to advance the slide plate 161. At the same time, the first pulse motor 164 is actuated, so that the paired grip arms 162A, 162B of the cassette holding mechanism 160 are opened apart and allowed to pass through the gripping-arm insertion openings 133B within the cassette holders 130 so as to be engaged in the engagement recesses 4, 4 in the lateral sides of the cassette tape 1 in the standby position to grip this cassette tape 1. The second pulse motor 169 is then run in reverse rotation to cause the slide plate 161 to be receded to pull the cassette tape 1 back into the inside of the original cassette holder 130. When the cassette tape 1 is at the preset position, the first pulse motor 164 is run in reverse rotation to open the hooks 162F, 162F apart to permit the cassette tape to be accommodated again in position.

The positions of the cassette tape 1, the rotational plate 121, the cassette holders 130, the slide plate 161 and the grip arms 162A, 162B are detected by a variety of sensors and sent to the encoder for various control operations. However, the present invention is not relevant to, e.g., control timing, so that the detailed operation thereof is omitted for simplicity.

The present invention is not limited to the embodiments described with reference to the drawings and, as may be apparent to those skilled in the art, various changes, substitutions or equivalents may be envisaged without departing from the scope and the purport of the invention as defined in the appended claims.

INDUSTRIAL APPLICABILITY

In the recording and/or reproducing apparatus according to the present invention, the recording and/or reproducing unit is mounted in an inner region surrounded by plural toroidally-arranged cassette holders, so that the apparatus itself may be reduced in size. In the present apparatus, the mechanism for insertion/ejection of the cassette tape may be simplified on account of the linear movement of the cassette tape from insertion of the cassette tape into the cassette housing mechanism until loading the cassette tape accommodated in the cassette housing mechanism to the recording and/or reproducing unit.

Since the height positions of the insertion/ejection opening formed in the front panel of the cabinet, cassette insertion/ejection opening in the recording and/or reproducing unit, outer and inner openings in the cassette holder and the cassette gripping mechanism are in the same plane, the recording and/or reproducing apparatus may be of a reduced height. In addition, the movement of the cassette tape may be simplified to assure reliable movements.

The invention claimed is:

1. A recording and/or reproducing apparatus comprising:
cassette housing means comprised of a plural number of cassette holders arranged in an annular array on the same horizontal plane with a preset distance from one another;
a recording and/or reproducing unit arranged within an area defined by said cassette holders for recording signal on a cassette tape or reproducing signals from a cassette tape;
cassette tape inserting/ejecting means for loading the cassette tape on said recording and/or reproducing unit and ejecting the cassette tape therefrom;
a cabinet having a cassette tape insertion/ejection opening on a front side thereof;
rotational driving means for rotationally driving a rotational plate to move said cassette housing means; and
movement means for moving said cassette tape inserting/ejecting means between a position proximate to said cassette holder and a position spaced apart from said cassette holder,
wherein the centers of the insertion/ejection opening, cassette housing means, recording and/or reproducing unit and the movement means are arrayed substantially in alignment with one another, and wherein a space which permits passage of said cassette tape inserting/ejecting means therethrough is provided in said cassette holder.

2. The recording and/or reproducing apparatus according to claim 1 wherein the movement of said cassette tape relative to said cassette holder and relative to said recording and/or reproducing unit occur substantially in the same horizontal plane.

3. The recording and/or reproducing apparatus according to claim 1 wherein an annular stationary substantially upstanding cassette stopper plate is provided facing inner openings of the plural toroidally arrayed cassette holders, said cassette stopper plate having an opening or cut-out to permit passage of a cassette tape when said cassette tape is extruded from said cassette holder into said recording and/or reproducing unit.

4. The recording and/or reproducing apparatus according to claim 1 wherein an extrication-proofing stopper for prohibiting outward extrication of a cassette tape is formed in an outer opening of said cassette holder accommodating said cassette tape therein.

5. The recording and/or reproducing apparatus according to claim 1 wherein mistaken cassette tape insertion preventative means, extruded from outside towards inside of said cassette holder and supported by a spring plate, is provided at a mid point of an upper plate of said cassette holder.

6. A recording and/or reproducing apparatus comprising:

cassette housing means comprised of a plural number of cassette holders arranged in an annular array on the same horizontal plane with a preset distance from one another;

a recording and/or reproducing unit arranged within an area defined by said cassette holders for recording signal on a cassette tape or reproducing signals from a cassette tape; and cassette tape inserting/ejecting means for loading the cassette tape on said recording and/or reproducing unit and ejecting the cassette tape therefrom, wherein an annular stationary substantially upstanding cassette stopper plate is provided facing inner openings of the plural toroidally arrayed cassette holders, said cassette stopper plate having an opening or cut-out to permit passage of a cassette tape when said cassette tape is extruded from said cassette holder into said recording and/or reproducing unit.

7. A recording and/or reproducing apparatus comprising:

cassette housing means comprised of a plural number of cassette holders arranged in an annular array on the same horizontal plane with a preset distance from one another;

a recording and/or reproducing unit arranged within an area defined by said cassette holders for recording signal on a cassette tape or reproducing signals from a cassette tape; and cassette tape inserting/ejecting means for loading the cassette tape on said recording and/or reproducing unit and ejecting the cassette tape therefrom, a cabinet having a cassette tape insertion/ejection opening on a front side thereof;

rotational driving means for rotationally driving a rotational plate to move said cassette housing means; and movement means for moving said cassette tape inserting/ejecting means between a position proximate to said cassette holder and a position spaced apart from said cassette holder, wherein the centers of the insertion/ejection opening, cassette housing means, recording and/or reproducing unit and the movement means are arrayed substantially in alignment with one another.

* * * * *